Patented Mar. 21, 1950

2,501,646

UNITED STATES PATENT OFFICE 2,501,646

SCREEN OIL

William C. Morris, Hayfield Heights, Ohio, assignor to The Harshaw Chemical Company, Elyria, Ohio, a corporation of Ohio No Drawing. Application October 8, 1947,
Serial No. 778,741

5 Claims. (Cl. 260—17)

This invention relates to screen oils or squeegee oils which are suspending agents for suspending pigmented ceramic fluxes for application to ceramic ware by various processes, notably a process known as the "screen process" or as the "squeegee process."

While the screen process in its variant forms is well known in the ceramic art, it may be said that it comprises essentially forcing a suspended vitrifiable material of the glaze or enamel type through the meshes of a screen composed of silk, metal or other material into contact with the ceramic ware to be decorated. It will be understood that the design is produced by masking such portions of the screen as overlie the surface areas of the ware not to be covered by the suspended vitrifiable material. This may be accomplished by means of a stencil or otherwise. Such suspensions may be applied not only by the screen process but by brushing or spraying as well.

The materials to be suspended in screen oil are various but may be such as for example are described in U. S. patent to C. J. Harbert and W. C. Morris, No. 2,390,366, issued December 4, 1945, it being understood that the glaze may be pigmented by any various color compositions known to the ceramic art including white and black compositions.

In order to be satisfactory, a screen oil must be of a consistency suitable for application by the screen process, must have enough body to avoid "running" after application to the ceramic ware and must volatilize almost completely during firing of the decorated ware so as to leave little or no carbon in the decoration. Obviously the time consumed in bringing up to maximum temperature during firing will affect the degree of volatilization of the screen oil, yet practically speaking, this time cannot be prolonged too much without unduly increasing the cost of the process.

We have now discovered that a screen oil of superior properties, meeting very satisfactorily the above indicated and other requirements can be produced by dissolving various components in a terpene solvent or a mixed solvent comprising mainly a terpene solvent such as pine oil and a minor amount of a hydrocarbon solvent, the components added to the solvent including, as a bodying agent, benzyl cellulose and preferably also including a soft resin or plasticizer and a hard resin. It is also highly desirable to have present a small quantity of a wetting agent such as lecithin.

The soft resin or plasticizer may be such a substance as methyl abietate (Abalyn) or methyl dihydroabietate (Hercolyn) or methyl, ethyl or glycerol esters of rosin acids or hydrogenated rosin acids (or other soft resins such as resins of the balsam type, e. g. copaiba balsam) which are soft solids or viscous liquids at room temperature (70° F.).

The hard resin may be a polymerized terpene resin or an alkyd resin containing a terpene acid radical in the molecule, such hard resins having melting points from 70° C. to 185° C.

The solvent may be principally a terpene solvent such as pine oil, dipentene, and Terposol #8, which are usual solvents for screen oils. We are able to use substantial proportions of hydrocarbon solvents such as xylene or toluene in place of part of the terpene solvent. Pine oil or other terpene solvent should still be the principal solvent, but the hydrocarbon solvent such as toluene or xylene may replace a portion of the terpene solvent from 1% up to 2% by weight.

The absolute essentials for the realization of our invention are the terpene solvent and a small proportion of benzyl cellulose. Desirably it also contains the hard and soft resins as indicated above and a wetting agent such as lecithin.

Suitable proportions are as follows:

| | Preferred | Optimum |
|---|---|---|
| | | Parts by weight |
| Solvent | 55–99 | 75–90 |
| Benzyl Cellulose | 0.25–10 | 1–5 |
| Soft Resin | 0–15 | 1–7 |
| Hard Resin | 0–40 | 5–15 |
| Wetting Agent | 0–5 | 0.25–0.5 |

The solvent contains a terpene solvent such as pine oil, dipentene, turpentine, terposol No. 8 and the like and optionally may contain up to 20 per cent by weight of a hydrocarbon solvent such as xylene, toluene and the like. The hard resin may be omitted but it is desirable to use a quantity as indicated above of one of the hard resins named or such quantity of a mixture thereof. The soft resin likewise may be omitted but it is highly desirable. The quantities indicated may be made up of one or a mixture of two or more of the resins indicated foregoing. The wetting agent may be omitted but it is very desirable to use the indicated quantities of lecithin or equivalent.

We have found that the indicated compositions meet the very exacting requirements for suspending glass enamels for application to ceramic ware by the screen or squeegee process, as well as by spraying or brushing, that they have suitable viscosity characteristics and volatilize away almost completely before the melting point of the suspended glaze (500° C.–600° C.) is reached.

Specific examples of screen oils according to the invention are shown in the following table wherein the numerical values indicate parts by weight:

|  | A | B | C | D | E | F | G | H | J | K | L |
|---|---|---|---|---|---|---|---|---|---|---|---|
| Benzyl Cellulose | 2 | 2 | 2 | 2 | 2 | 4 | 4 | 4 | 3 | 4 | 2 |
| Pine Oil | 88 | 84.75 | 83 | 88 | 88 | 81 | 81 | 81 | 79 | 69.5 | 88 |
| Alkyd Resin, M. P. 72–78° C., Acid No. 10–15 | 10 |  | 8 |  |  |  |  |  | 10 | 15 |  |
| Methyldihydroabietate |  |  |  |  |  | 5 | 5 | 5 | 5 | 3 |  |
| Hydrogenated Rosin, M. P. 163–173° F., Acid No. 78 |  | 3 |  |  |  | 10 |  |  |  |  |  |
| Alkyd Resin, M. P. 118–122° C., Acid No. 135 |  | 10 | 7 |  | 10 |  |  |  |  |  |  |
| Rosin Ester (Pentaerythritol), M. P. 130–140° C., Acid No. 15–16 |  |  |  | 10 |  |  |  |  |  |  |  |
| Hydrogenated Rosin Ester (Glycerol Ester), M. P. 80–85° C., Acid No. 10 |  |  |  |  |  |  | 10 |  |  |  |  |
| Polymerized Rosin Ester (Glycerol Ester), M. P. 117° C., Acid No. 8–10 |  |  |  |  |  |  |  | 10 |  |  |  |
| Lecithin |  | 0.25 |  |  |  |  |  |  |  | 0.5 |  |
| Dipentene ($C_{10}H_{16}$), B. P. 175–188° C |  |  |  |  |  |  |  |  | 3 |  |  |
| Terposol #8 [1] |  |  |  |  |  |  |  |  |  | 8 |  |
| Rosin Ester (Pentaerythritol) M. P. 112–115; Acid No. 14–16 |  |  |  |  |  |  |  |  |  |  | 10 |

[1] A solvent prepared according to U. S. Patent No. 2,136,011 by reacting a polyhydric alcohol with an unsaturated terpene.

Having thus described my invention, what I claim is:

1. A screen oil composition essentially consisting of from 55 to 99 parts by weight of a terpene solvent and from 0.25 to 10 parts by weight of benzyl cellulose the same also containing from 0.5 to 15 parts by weight of a resin of consistency at room temperature from that of a soft solid to that of a viscous liquid and selected from the group consisting of the methyl, ethyl and glycerol esters of rosin acid and hydrogenated rosin acid, and copaiba balsam; and from 1 to 40 parts by weight of a resin of melting point from 70° C. to 185° C. selected from the group consisting of polymerized terpenes and glycerol esters of terpene acids.

2. A screen oil composition containing 50 to 99 parts by weight of a terpene solvent; from 0.25 to 20 parts by weight of benzyl cellulose; from 0.5 to 15 parts by weight of a plasticizer of consistency from that of a soft solid to that of a viscous liquid at 70° F. the same being from the class consisting of the methyl, ethyl and glycerol esters of rosin acid and hydrogenated rosin acid, and copaiba balsam; from 1 to 40 parts by weight of a resin of melting point from 70° C. to 185° C. and selected from the group consisting of polymerized terpenes and glycerol esters of terpene acids; and from 0.1 to 1.0 parts by weight of lecithin.

3. The screen oil as claimed in claim 2, wherein a portion of the solvent from 1% up to 20% by weight is replaced by an equal weight of hydrocarbon solvent.

4. A screen oil composition containing from 75 to 90 parts by weight of a terpene solvent; from 1 to 5 parts by weight of benzyl cellulose; from 1 to 7 parts by weight of a plasticizer of consistency from that of a soft solid to that of a viscous liquid at 70° F., the same being from the class consisting of methyl, ethyl and glycerol esters of rosin acid and hydrogenated rosin acid, and copaiba balsam; and from 5 to 15 parts by weight of a resin of melting point from 70° C. to 185° C. and selected from the group consisting of polymerized terpenes and glycerol esters of terpene acids.

5. A screen oil as claimed in claim 4 wherein a portion of the solvent from 1% to 20% by weight is replaced by an equal weight of hydrocarbon solvent.

WILLIAM C. MORRIS.

REFERENCES CITED

The following references are of record in the file of this patent:

UNITED STATES PATENTS

| Number | Name | Date |
|---|---|---|
| 2,063,837 | Bruson | Dec. 8, 1936 |
| 2,308,763 | Little | Jan. 19, 1943 |
| 2,429,603 | Borglin | Oct. 28, 1947 |

OTHER REFERENCES

Page 3, Benzyl Cellulose, Hercules Powder Company publication, 1944.

Certificate of Correction

Patent No. 2,501,646                                              March 21, 1950

WILLIAM C. MORRIS

It is hereby certified that errors appear in the above numbered patent requiring correction as follows:

In the grant, line 1, and in the heading to the printed specification, line 3, address of inventor, for "Hayfield Heights, Ohio" read *Mayfield Heights, Ohio*; and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*